(No Model.) 2 Sheets—Sheet 1.

G. EVANS.
MANUFACTURE OF ARTIFICIAL TOOTH CROWNS.

No. 373,348. Patented Nov. 15, 1887.

WITNESSES:

INVENTOR
George Evans
BY
Chas. N. Forbes
ATTORNEY (No Model.) 2 Sheets—Sheet 2.

G. EVANS.
MANUFACTURE OF ARTIFICIAL TOOTH CROWNS.

No. 373,348. Patented Nov. 15, 1887.

WITNESSES:
Aug Creveling
W. W. Weston

INVENTOR
George Evans
BY
Chas. W. Forbes
ATTORNEY

UNITED STATES PATENT OFFICE.

GEORGE EVANS, OF NEW YORK, N. Y.

MANUFACTURE OF ARTIFICIAL TOOTH-CROWNS.

SPECIFICATION forming part of Letters Patent No. 373,348, dated November 15, 1887.

Application filed March 9, 1887. Serial No. 230,221. (No model.)

*To all whom it may concern:*

Be it known that I, GEORGE EVANS, a citizen of the United States, residing at the city, county, and State of New York, have invented certain new and useful Improvements in the Manufacture of Artificial Tooth-Crowns, of which the following is a specification, reference being had to the accompanying drawings, in which like letters of reference indicate like parts throughout the several views.

This invention relates to improvements in means for contouring artificial crowns employed to build upon the sound root of an imperfect tooth a grinding-surface corresponding in character and form to the natural grinding-surface of an original crown.

My invention consists in certain improved methods, hereinafter fully described, of shaping hollow cup-shaped crowns of gold, silver, platinum, or other suitable material into a form corresponding with greater accuracy to the peculiarities which characterize the tooth to be replaced than has been accomplished by methods heretofore employed, especially with regard to contouring the sides of the crown; and in order that others skilled in the art to which my invention relates may be enabled to understand and use the same I will proceed to describe the distinctive features of its construction, explain the use of the same, and set forth in the appended claims such characteristics as are novel.

Figure 1:
Figure 2:
Figure 3:
Figure 4:
Figure 5:
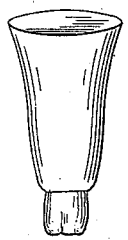
Figure 6:
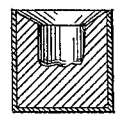
Figure 6:
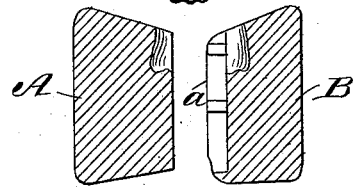
Figure 7:
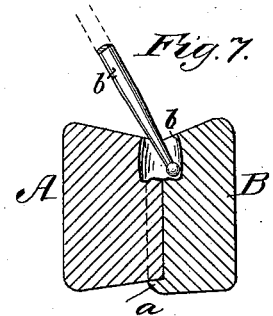
Figure 8:
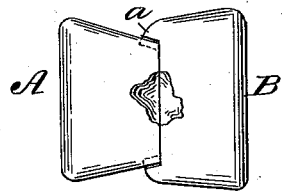
Figure 9:
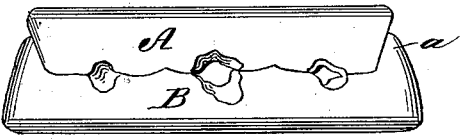
Figure 10:
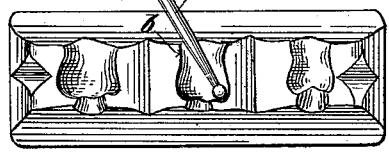
Figure 11:
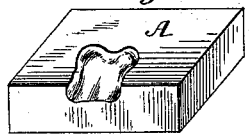
Figure 12:
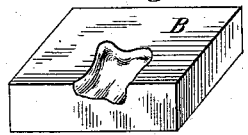
Figure 13:
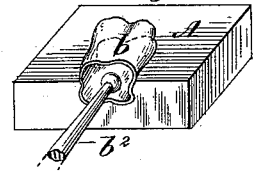
Figure 14:
Figure 17:
Figure 16:
Figure 15:
Figure 18:
Figure 19:
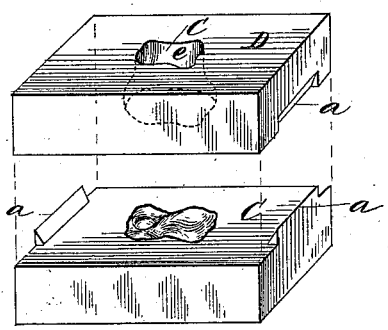
Figure 20:
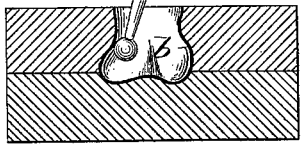
Figure 22:
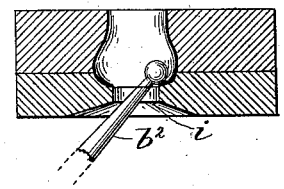
Figure 21:
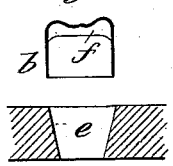

Referring to the drawings, Figure 1 is a sectional view of the usual crown-blank made of one piece; Fig. 2, a similar view of the component parts of a crown-blank to be subsequently completed by soldering; Fig. 3, a blank having its grinding-surface stamped upon it by former methods; Fig. 4, an elevation, partly in section, of the dies heretofore employed for imparting to the blank the grinding-surface; Fig. 5, an exterior perspective view of a crown completed according to my invention; Figs. 6 and 7, sectional views, and Fig. 8 a plan view, of a sectional die by means of which my improved process may be carried into effect; Figs. 9 and 10, a plan and a longitudinal interior elevation, respectively, of a modified sectional die; Figs. 11, 12, and 13, perspective views of sectional molds, illustrating a modified manner of using the same; Fig. 14, a sectional view of a "contracting-plate" commonly used in dentistry; Fig. 15, a perspective view of a sectional contracting-mandrel; Fig. 16, a sectional view of a blank having had its aperture contracted by said plate or sectional mandrel; Fig. 17, a section of a contracting-plate having a contouring-cavity made according to one form of my invention; Fig. 18, a metal crown shaped in the contracting-plate, Fig. 17; Fig. 19, a perspective view of a contoured contracting-plate and crown-mold shown detached therefrom; and Fig. 20, a sectional view of the same, showing a crown in position therein being formed; Fig. 21, a sectional view illustrating a method herein referred to of treating the crown with filling before contouring; Fig. 22, a sectional view of a modified construction of molds; and Fig. 23, a side view of a crown, designating certain technical divisions of the same.

Hitherto the blanks of metal having a grinding-surface stamped thereon, as in Fig. 3, which represents a crown having a grinding-surface approximating in shape to a perfect molar tooth, have been adjusted to the cervical margins of the root by bending the sides of the blank by imperfect means—such as the application of pliers—and approximating the form so as to force the same into position, the form of said grinding-surface being produced by means of hammering the same between a pair of dies of a construction shown in Fig. 4, which manifestly fail to impart to the sides of the blank a form approaching a natural contour.

My improved process, as practiced in the manner illustrated by Figs. 1 to 10, inclusive, is as follows: An accurate impression of the tooth to be crowned is first taken by means of pressing thereon a plastic material—such as plaster-of-paris—and dividing the same so as to remove it from the tooth and retain in it the counterpart cavities or impressions corresponding to the surfaces of the tooth. This is allowed to harden, and from this mold is obtained an exact duplicate of the tooth in regard to form by compressing therein a plastic substance of any suitable composition of a quality which will afterward resist heat. The duplicate of the tooth thus produced is now used as a core for casting in a mold a pair of dies of metal or other suitable material, and having any convenient exterior form, as shown in Figs. 6, 7, and 8. For these dies I prefer to use Babbitt metal; or other alloy fusible at low temperature may be likewise used. The dies are preferably cast in two parts, A B, and matched by means of flanges or tongues and sockets *a* cast on their edges, so that the interior surfaces of the mold shall coincide when brought together.

Between the sections of the dies so obtained I place a crown, *b*, of platinum, gold, or other suitable thin malleable metal—such as shown in Fig. 1, consisting of a plain blank, or Fig. 3, a blank having a convenient grinding-surface stamped thereon; or, in cases where the blank is composed of separate pieces, as shown by Fig. 2, each part *b b'* of the same may be applied separately or together before or after being soldered. The dies A B are now brought together or nearly together and held by the hand or clamped in a suitable clamping device in the position shown in Figs. 7 and 8, during which operation the sides of the crown will be forced approximately into the irregular cavities of the dies. A suitable burnishing-tool, such as commonly used in dentistry, or a revolving burnisher or other equivalent, is now applied to the interior of the crown, and by means of this instrument the malleable metal is pressed or forced into the more minute recesses of the sectional cavities by continued pressing and burnishing of every part of its interior surface. The dies being separable, the finished crown may be readily removed, its inner part or irregularities of the same being usually of a size in excess of the aperture of the mold. The grinding-surface of the crown is formed from the smooth cap of the blank, Figs. 1 or 2, or altered from the stamped shape shown in Fig. 3 during this operation to conform with the peculiarities of the tooth corresponding to the mold.

Should the top and sides of the crown be applied in separate pieces within the sectional dies, Figs. 6, 7, 8, they may be soldered subsequently to the operation herein described. For convenience of forming the sides of the metal in a separate piece, a modified pair of dies—such as shown in Figs. 8 and 9—may be employed, the feature of said modification consisting in having the cavities or mold of the dies open at either end, permitting easier access to and observation of the interior while the burnishing-instrument is being applied to form the said portions of the metal. In the instance of Figs. 8 and 9 compound dies are illustrated, which additional feature is equally applicable to the preceding forms of dies, the several cavities or molds bearing no relation to one another, but corresponding to various teeth, the said construction being intended for purposes of convenience in casting or rapidity of forming the several crowns at one operation.

The dies A and B (shown by Figs. 11, 12, and 13) may also be used for forming the opposite sides of the crown separately, in the manner illustrated by Fig. 13, said dies being conveniently modified in exterior form for the purpose.

My invention further comprises certain improved devices which are analogous in some features to those known in dentistry as "contracting-plates," used for contracting and shaping the aperture and converging the sides of crowns by forcing the same into converging holes in the contracting-plates, and adapting them thereby to fit the sound root of the imperfect tooth, as required.

These devices are illustrated by Figs. 11 to 23, inclusive, and combine in a single device the functions of a contracting-plate and of a contouring-mold for forming the sides of the crown-blank into a natural form. An elementary construction of this improvement is shown exaggerated in a certain degree in Fig. 17, the feature therein being the reversed curved profile of the contracting aperture as appears in section at *c* and *d*. The curves *d* impart to the opening of the crown an elongated lap upon the cervical margins of the root, (*d'*, Fig. 18,) while the curves *c* impart to the sides of the crown a convex contour, *c'*, as illustrated.

The perfect conformation of the metal to the mold may be effected by the introduction of a suitable compressing-tool to the interior of the crown, preferably a burnishing-tool. This mold may be used to contract and contour a blank, Fig. 1, directly to the form of Fig. 18; but preferably the original blank is first subjected to contraction by forcing it into the converging hole *e* of an ordinary contracting-plate, Fig. 14, or by spinning and reducing its aperture upon a sectional mandrel, Fig. 15, having a construction similar to that I have described in an application filed December 27, 1886, No. 222,634, the said mandrel being afterward removed by dropping it out in pieces. This operation imparts to the blank the preparatory form, Fig. 16, the same having straight converging sides.

The blank, in case of having a grinding-surface already stamped thereon, may, as illustrated in Fig. 21, be re-enforced by a gutta-percha, lead, or other suitable filling, *f*, prior to the contracting operation for the purpose of sustaining the contour of said grinding-surface.

To facilitate contouring, the sides of the crown may be slit, as at *g*, Fig. 23, or a narrow V-shaped section removed, so as to permit the more ready contraction of the cervical part or expansion of the remaining part of the sides, or both, the same being subsequently soldered.

Figure 23:
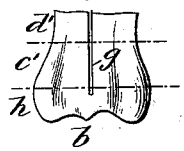

It will be observed that the curvatures of the mold, Fig. 17, are located so as to produce a concavity of profile upon that portion of the crown (*d'*, Fig. 23) known in dentistry as the "cervical third," a reverse curve at the beginning of the "middle third," (*c'*, Fig. 23,) and a convexity of surface from thence to and upon the "occluding third," (*h*, Fig. 23.) These features are likewise applicable to the plate Figs. 19 and 20, the same differing from Fig.

17 in having its cavity e of a form corresponding more precisely to the peculiar irregularities of an original tooth. The same is obtained by reproducing from the original tooth a fac-simile in plaster, the latter being molded from plaster impressions taken from the tooth in the manner hereinbefore described, and using said fac-simile as a core for casting the plate D with its converging aperture e, the said plate being for convenience cast of metal fusible at low temperature. In the plate D a metal crown, with or without a grinding-surface stamped thereon, or a crown-collar, may be contracted and formed in the manner described with relation to Fig. 17; but, furthermore, I may employ in conjunction with the plate D a mold, C, having a cavity for imparting or altering a grinding-surface upon the cap of the crown at the time of forming or contouring said crown within the molds by a suitable welding-tool when the molds are brought together, as in Fig. 20. Furthermore, the mold C may be constructed with an opening, i, Fig. 22, through which the forming-tool can be introduced, as illustrated, when it is desired to weld a crown-collar extending partly over the grinding-surface or occluding third of the crown, the collar being designed to have a separate grinding-surface soldered thereon.

The seamless band b, Fig. 2, (but having straight sides,) may furthermore be contoured by "striking up" in a die similar to Fig. 5, but embodying only the contouring molding-surface thereof corresponding to the cervical and the middle third of the tooth, the said mold being adapted so that the cervical third (or end of the band to be enlarged) is uppermost in the female mold, and may therefore be removed and the crown-blank b′ similarly "struck up" in an inverted position in another die of similar character adapted therefor, the two parts being subsequently united by soldering, as hereinbefore referred to.

Having thus fully described my invention, I claim and desire to secure by Letters Patent—

1. In the manufacture of artificial metallic tooth-crowns, the process of welding or pressing the same into molds or cavities between sectional dies having a conformation corresponding to that of the natural tooth-crown to be replaced by the application of pressure, substantially as described, upon the interior of said metallic crown while within said dies.

2. In a contracting-plate for contracting the aperture of hollow metallic tooth-crowns, the construction, substantially as described, of convex and concave curvatures located, as shown, in the contracting hole of said plate for the purpose of contouring said crowns therein, in the manner described.

3. The combination, with a contracting-plate for contracting the aperture of hollow metallic tooth-crowns and having a contoured contracting hole, substantially as described, of a supplemental mold having a contoured cavity for imparting to said crowns a grinding-surface when said crowns are welded therein, in the manner described.

4. The combination, with a contracting-plate for contracting hollow metallic tooth-crown collars and having a contoured contracting hole, substantially as described, of a supplemental mold having a cavity contoured at that portion which is employed for contouring the margins of the grinding-surface upon the edge of said collar, said cavity being open to the exterior of the mold at its central portion for the introduction of a welding-tool, in the manner described.

GEORGE EVANS.

Witnesses:
CHAS. W. FORBES,
AUG. CREVELING.

It is hereby certified that in Letters Patent No. 373,348, granted November 15, 1887, upon the application of George Evans, of New York, New York, for an improvement in the "Manufacture of Artificial Tooth-Crowns," errors appear in the printed specification requiring the following corrections, viz: On page 2, line 55, the words and figures "Figs. 8 and 9" should read *Figs. 9 and 10;* on page 3, line 47, the word "welding" should read *forming;* in line 67, same page, the word "welded" should read *formed,* and in line 78, same page, the compound word "welding-tool" should read *forming-tool;* and that the said Letters Patent should be read with these corrections therein that the same may conform to the record of the case in the Patent Office.

Signed, countersigned, and sealed this 20th day of December, A. D. 1887.

[SEAL.]

D. L. HAWKINS,
*Acting Secretary of the Interior.*

Countersigned:
BENTON J. HALL,
*Commissioner of Patents.*